(12) United States Patent
Liu et al.

(10) Patent No.: US 8,990,663 B2
(45) Date of Patent: Mar. 24, 2015

(54) METHOD TO SUPPORT FORWARD ERROR CORRECTION FOR REAL-TIME AUDIO AND VIDEO DATA OVER INTERNET PROTOCOL NETWORKS

(75) Inventors: Hang Liu, Yardley, PA (US); Mary-Luc Champel, Marpire (FR); Mingquan Wu, Plainsboro, NJ (US); Xiaojun Ma, Beijing (CN); Huanqiang Zhang, Beijing (CN); Jun Li, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 630 days.

(21) Appl. No.: 12/448,156

(22) PCT Filed: Dec. 21, 2006

(86) PCT No.: PCT/US2006/049057
§ 371 (c)(1),
(2), (4) Date: Jun. 10, 2009

(87) PCT Pub. No.: WO2008/076125
PCT Pub. Date: Jun. 26, 2008

(65) Prior Publication Data
US 2009/0276686 A1 Nov. 5, 2009

(51) Int. Cl.
*H04L 1/00* (2006.01)
(52) U.S. Cl.
CPC ............ *H04L 1/0041* (2013.01); *H04L 1/0045* (2013.01); *H04L 1/0084* (2013.01)
USPC ........................................................ 714/776
(58) Field of Classification Search
CPC ... H04L 1/0057; H04L 1/0025; H04L 5/0044; H04W 72/04; H03M 13/13
USPC ........................................................ 714/776
See application file for complete search history.

(56) References Cited

U.S. PATENT DOCUMENTS 5,870,412 A * 2/1999 Schuster et al. .............. 714/752
6,421,387 B1 7/2002 Rhee
(Continued)

FOREIGN PATENT DOCUMENTS

EP 1271830 A2 1/2003
JP 11136220 5/1999
(Continued)

OTHER PUBLICATIONS

Rosenberg et al., "rfc2733_FECFormat," Network Working Group, Category: Standards Track, Dec. 1999, pp. 1-24.
(Continued)

*Primary Examiner* — Jigar Patel
(74) *Attorney, Agent, or Firm* — Robert D. Shedd; Jeffrey M. Navon; Catherine A. Cooper

(57) ABSTRACT

A method and apparatus are described for protecting real time media including receiving media packets, generating media bit strings from the media packets, applying a forward error correcting code across the generated media bit strings to generate at least one forward error correcting bit string and generating at least one forward error correcting packet from the at least one forward error correcting bit string. Also described are a method and apparatus for recovering from losses of real time media packets including forming media bit strings from received media packets, forming forward error correcting bit strings from received forward error correcting packets, decoding the formed media bit strings and forward error correcting bit strings to obtain recovered media bit strings and recover lost media packets from the recovered media bit strings. Further described is a data structure for a forward error correcting header on computer readable media.

23 Claims, 6 Drawing Sheets

(56) References Cited

U.S. PATENT DOCUMENTS

| | | | |
|---|---|---|---|
| 6,516,435 B1 | 2/2003 | Tsunoda | |
| 6,697,984 B1 | 2/2004 | Sim et al. | |
| 6,745,364 B2 | 6/2004 | Bhatt et al. | |
| 6,751,209 B1* | 6/2004 | Hamiti et al. | 370/349 |
| 6,771,674 B1* | 8/2004 | Schuster et al. | 370/537 |
| 7,151,754 B1 | 12/2006 | Boyce et al. | |
| 7,216,282 B2 | 5/2007 | Cain | |
| 7,539,925 B2 | 5/2009 | Yamane | |
| 2001/0033611 A1* | 10/2001 | Grimwood et al. | 375/219 |
| 2002/0164024 A1* | 11/2002 | Arakawa et al. | 380/210 |
| 2004/0076156 A1* | 4/2004 | Furrer et al. | 370/389 |
| 2004/0100987 A1* | 5/2004 | Marque-Pucheau | 370/447 |
| 2004/0247238 A1* | 12/2004 | Argon et al. | 385/24 |
| 2006/0109805 A1* | 5/2006 | Malamal Vadakital et al. | 370/299 |
| 2009/0046580 A1* | 2/2009 | Botzko et al. | 370/229 |

FOREIGN PATENT DOCUMENTS

| | | |
|---|---|---|
| JP | 2003092564 | 3/2003 |
| JP | 2004274214 | 9/2004 |
| JP | 2005175837 | 6/2005 |
| JP | 2006325113 | 11/2006 |
| TW | I248735 B | 2/2006 |
| WO | WO2005041466 | 5/2005 |

OTHER PUBLICATIONS

SMPTE, "Forward Error Correction for Real-time Video/Audio Transport Over IP Networks," SMPTE Standard for Television, SMPTE 2002-1, Rev 2, SMPTE Technology Committee N26 on File Management and Networking Technology, Sep. 15, 2006.

International Search Report, Sep. 19, 2007.

Adam Li, Editor: "RTP Payload Format for Generic Forward Error Correction; draft-ietf-avt-ulp-19.txt" Oct. 22, 2006 vol. avt, n°19, ISSN:0000-0004.

Paul E Jones Cisco Systems et al"Revised text for draft new H.323 Annex I (H.323 over error-prone channels); TD 172 (WP 2/16)" ITU-T Drafts; Study Period 2005-2008, International Telecommunication Union.

Aibara et al., "Development of an HDTV MPEG2 over IPv6 System", IPSJ SIG Technical Reports, Information Processing Society of Japan, vol. 2002, No. 93, Oct. 10, 2002, pp. 7-12.

Supplementary European Search Report dated Mar. 6, 2012.

PRO-MPEG Forum, "Transmission of Professional MPEG-2 Transport Streams Over IP Networks", Pro-MPEG Code of Practice #3, Release 2, Jul. 2004, pp. 1 and 5-11.

* cited by examiner

FEC(h, m) = FEC(Index, SNbase)

```
+-+-+-+-+-+-+-+-+-+-+-+-+-+-+-+-+-+-+-+-+-+-+-+-+-+-+-+-+-+-+-+-+
|        SNBase low bits        |        Length Recovery        |
+-+-+-+-+-+-+-+-+-+-+-+-+-+-+-+-+-+-+-+-+-+-+-+-+-+-+-+-+-+-+-+-+
|E| PT recovery |Index ext|      Reserved      |    Total_no    |
+-+-+-+-+-+-+-+-+-+-+-+-+-+-+-+-+-+-+-+-+-+-+-+-+-+-+-+-+-+-+-+-+
|                           TS recovery                         |
+-+-+-+-+-+-+-+-+-+-+-+-+-+-+-+-+-+-+-+-+-+-+-+-+-+-+-+-+-+-+-+-+
|N|D|Type |Index|     Offset    |      NA      |SNBase ext bits|
+-+-+-+-+-+-+-+-+-+-+-+-+-+-+-+-+-+-+-+-+-+-+-+-+-+-+-+-+-+-+-+-+
```

METHOD TO SUPPORT FORWARD ERROR CORRECTION FOR REAL-TIME AUDIO AND VIDEO DATA OVER INTERNET PROTOCOL NETWORKS

This application claims the benefit, under 35 U.S.C. §365 of International Application PCT/US2006/049057, filed Dec. 21, 2006 which was published in accordance with PCT Article 21(2) on Jun. 26, 2008 in English.

FIELD OF THE INVENTION

The present invention relates generally to forward error correction (FEC) for real-time audio and video data transmitted over internet protocol (IP) networks, and in particular to a signaling method to support FEC for real-time audio and video transmitted over IP networks and syntax to support the signaling method.

BACKGROUND OF THE INVENTION

Packets may be lost during transmission over IP networks. However, packet losses are not acceptable for many networked applications such as real-time video and audio applications. Application layer forward error correction (FEC) provides a method to recover lost media/data/source packets at the receiver/decoder. As used herein, "/" indicates alternative names for the same or like components. FEC codes are applied across source packets at the transport or application layer to generate FEC packets, which contain redundant information, at the sender/encoder or other nodes in the network. These FEC packets are transmitted to the receiver and the receiver recovers lost source packets using the redundant information in the received FEC packets.

Different coding methods and different FEC codes can be used to generate redundancy at the sender/encoder. The receiver/decoder needs to have information about coding method and parameters in order to decode and recover the lost source packets. Therefore, a signaling method and syntax are required for the sender/encoder to inform the receiver/decoder regarding FEC coding information.

Real-time transport (RTP) and User Datagram Protocol (UDP) protocols are generally used for real-time video/audio transmission/transport over/in IP networks. The payload (source packets) is encapsulated in the RTP/UDP/IP protocol stack. An RTP payload format for generic FEC packets has been defined in the RFC 2733 to enable error correction of real-time media. However, RFC 2733 limits the scope of packets used to generate the FEC payload, to 24 consecutive packets and only allows generation of one FEC packet for a block of media/source/data packets.

The Society of Motion Picture and Television Engineers (SMPTE) standard 2002-1 defines an extension to RFC 2733, which allows error correction codes to be applied to non-consecutive media packets that can be spaced over more than 24 source/media packets for burst loss recovery. However, SMPTE 2002-1 only allows Exclusive OR (XOR) encoding on a block of media packets to generate a single FEC parity packet so that only one packet loss can be corrected in an encoded block of packets. In IP networks, especially those with wireless links, packet losses may be quite high so that a FEC coding scheme with more powerful error correction capability is needed to adequately detect and correct packet losses for real-time audio and video transmitted over IP networks. Furthermore, in SMPTE 2002-1, the FEC packet signaling method and syntax do not include the total number of packets (media+FEC) for an encoded block. That is, the FEC block size is not included in a header. The sender/encoder, thus, cannot inform the receiver/decoder regarding the FEC block size information. For a more powerful FEC (N, K) code, the value of the total number of packets for an encoded block, i.e. the block size is N and the number of media packets to be protected in an encoded block is K. For example, if K media packets are encoded to generate N-K FEC packets with a Reed-Solomon (N, K) code, up to N-K losses of packets in a block of N encoded packets can be recovered. For XOR encoding, the block size N can be obtained from the number of media packets to be protected, i.e. N is always equal to K+1 since XOR encoding only generates a single FEC packet from K protected media packets and only correct one packet loss. However this is not true for a FEC (N, K) code with more powerful error correction capability. Unlike XOR encoding, the block size N for a FEC (N, K) code is an independent parameter and may not be directly related to K. N must be known at the receiver/decoder to recover the lost packets correctly. The SMPTE 2002-1 standard is not sufficient to support the signaling of the FEC (N, K) code parameters that requires the FEC block information for decoding/recovery operation.

Therefore, a new data structure/syntax for a FEC header to support more powerful FEC code, for example, RS code, for real-time video/audio transport over IP networks would be advantageous. Related to a new data structure/syntax for the FEC header, a new protection/encoding method at the sender is needed so that both the RTP header and payload of the media packets can be properly protected. Furthermore a new recovery method at the receiver is needed.

SUMMARY OF THE INVENTION

The present invention provides a signaling method and syntax to support FEC for real-time audio and video transmitted over IP networks. Furthermore, the present invention provides a method to generate the FEC packets applying FEC coding to source packets at the sender/encoder and a method to recover the lost source packets at the receiver/decoder. Although Reed-Solomon coding is used as an example to explain the methods in accordance with the present invention, the present invention is equally applicable other FEC coding schemes.

A method and apparatus are described for protecting real time media including receiving media packets, generating media bit strings from the media packets, applying a forward error correcting code across the generated media bit strings to generate at least one forward error correcting bit string and generating at least one forward error correcting packet from the at least one forward error correcting bit string. Also described are a method and apparatus for recovering from losses of real time media packets including forming media bit strings from received media packets, forming forward error correcting bit strings from received forward error correcting packets, decoding the formed media bit strings and forward error correcting bit strings to obtain recovered media bit strings and recover lost media packets from the recovered media bit strings. Further described is a data structure for a forward error correcting header on computer readable media, where the data structure includes a field for storing a predetermined number of higher order bits of a forward error correcting parity packet index. Further described is a data structure for a forward error correcting header on computer readable media, where the data structure includes a field for indicating a total number of forward error correcting packets and media packets.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

In addition to the type of FEC code, a FEC code is specified by its parameters such as the block size N and the number of source symbols K. When a (N, K) systematic FEC code is applied across K media/source/data packets, N−K FEC packets are generated. For example, Reed-Solomon (RS) codes are well known erasure correction codes. If K media packets are encoded to generate N−K FEC packets with a RS (N, K) code, any subset of K packets are sufficient to reconstruct the media data with erasure correction, i.e. a RS (N, K) code allows for recovery from up to N−K packet losses in a block of N encoded packets. Because the entire packet is discarded by the lower layer such as media access control layer, IP layer or UDP layer if there is even a single bit error, a packet will either arrive correctly or not at all above the UDP layer, i.e., the RTP or application layer. The method of the present invention is above the UDP layer. In the present invention, it is assumed that a packet is either received correctly or lost. If a packet is lost, the position of the lost packet is known from the sequence number in the RTP header.

Figure 1:
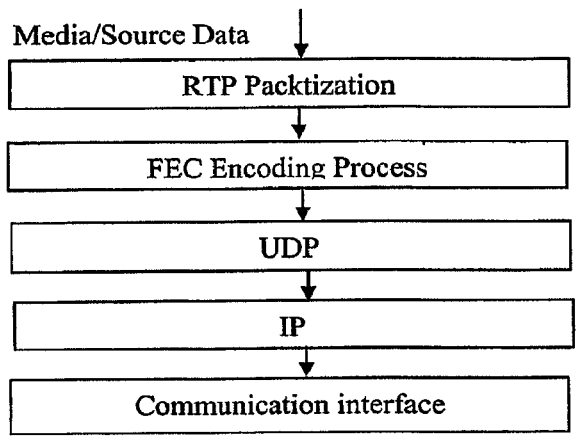
FIG. 1 illustrates the process at the sender/encoder.

Referring to FIG. 1, media/source data such as audio and/or video data are packetized by the RTP packetizer 105 and encapsulated with a RTP header. The FEC code is then applied across multiple media packets by a FEC encoding process 110 to generate FEC packets. The media packets and additional FEC packets are transmitted through UDP/IP protocol stack 115, 120 over the communications interface 125. In order to be backward compatible with non-FEC capable systems, the format of the media packets is not changed by the FEC encoding process of the present invention. That is, the media packets are still able to be received and recovered by a non-FEC system. The signaling information regarding the FEC parameters are carried in the FEC packets. The media packets and the FEC packets may be transmitted using different UDP ports. Non-FEC systems thus receive only media packets from the UDP port used for media packets. The FEC packet may also be specified by a different payload type in the RTP header. In an alternative embodiment, the FEC packet and the media packet can be distinguished by their payload type. A non-FEC system will discard FEC packets if it cannot recognize the payload type.

The scheme of the present invention is able to recover from multiple packet losses in an encoded block. If a one dimensional scheme based on a RS (N, K) code is used (i.e. The RS (N, K) code is applied across K consecutive media packets), a burst error of N−K or less lost media packets can be recovered.

Figure 2:
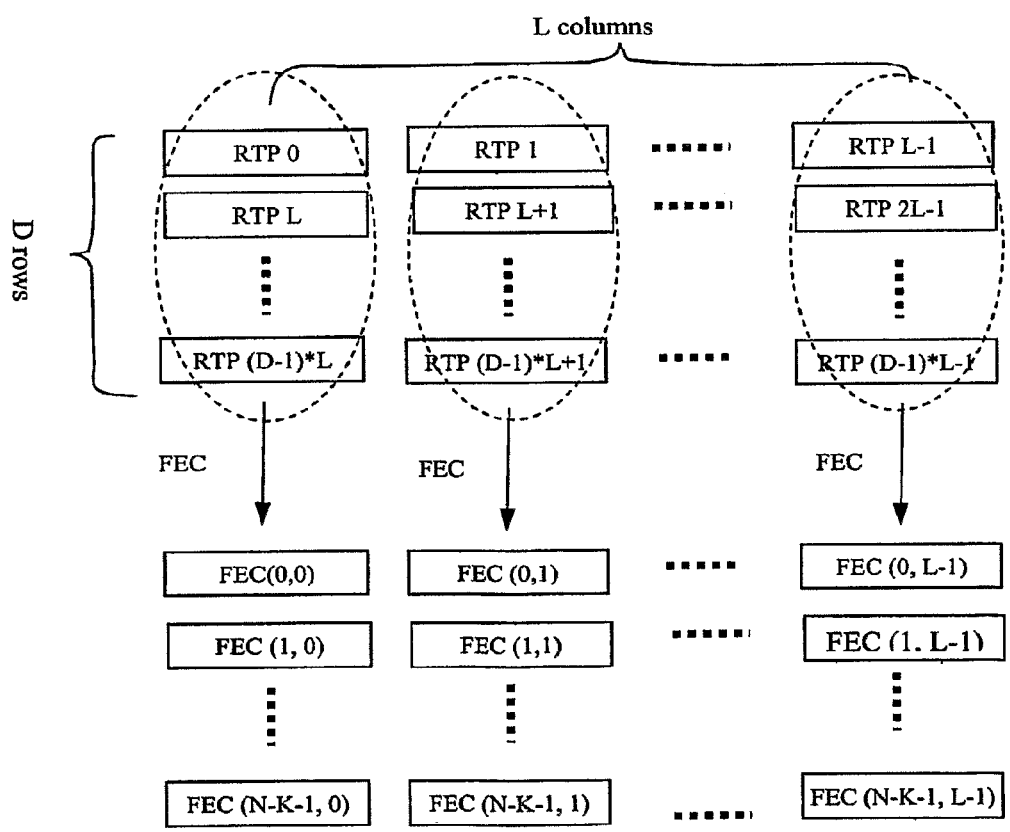
FIG. 2 illustrates an encoding scheme in accordance with the present invention.

Before the encoding method of the present invention, the media RTP packets may be reordered. Referring to FIG. 2, L×D media packets form a two dimensional matrix. The media packets in an encoded block may be periodically selected. That is, the FEC packets are generated across media RTP packets with the sequence number increased by a value of L (L>=1). L designates the number of columns of packets to be protected and D designates the number of rows of packets to be protected. If a two dimensional scheme FEC coding scheme is used, burst error recoverability is further improved, since it can recover up to L×(N−K) consecutive lost packets. At the transmitter, the media packets protected by the same FEC packets are separated by L packets protected by the other FEC packets, thereby reducing the number of error packets in an encoded block if a burst occurs. Before decoding at the receiver, the received packets are reordered as shown in FIG. 2. Therefore, consecutive RTP packets can be recovered from different FEC packets.

In FIG. 2, the encoding scheme for L*D media packets is illustrated. The period chosen between media packets covered by a given FEC (N, K) (e.g., RS) code is L. Thus the payload of the FEC packet (h, m) (h=0, 1 ... N−K−1; m=0, 1 ... L−1) is computed based on the D packets (D=K) numbered iL+m (0≤i≤D−1). The one dimensional scheme, i.e. applying a FEC (N, K) code to K consecutive media packets is a special case of the two dimensional scheme with L equal to 1. The alignment of the columns is exemplary for illustration. Other methods for organizing the data packets to create the FEC column streams are possible.

Two simultaneous FEC streams are also able to be supported, which will allow for an even higher error correction capability, at the expense of increased overhead. These FEC streams may be carried on separate UDP ports and have separate RTP sequence number handling to maintain backward compatibility with receivers that only support a single FEC stream. As an example, the lower numbered port may carry the column FEC stream and the second port may carry the row FEC stream.

Figure 3:
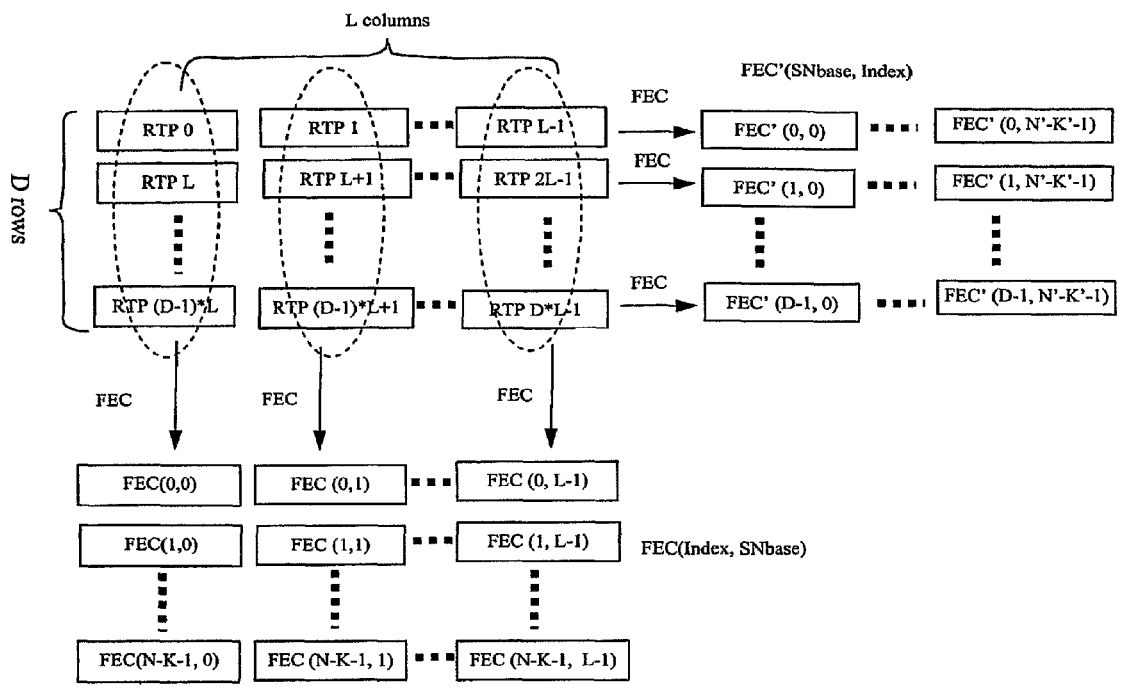
FIG. 3 illustrates an alternative encoding scheme in accordance with the present invention.
Figure 4:
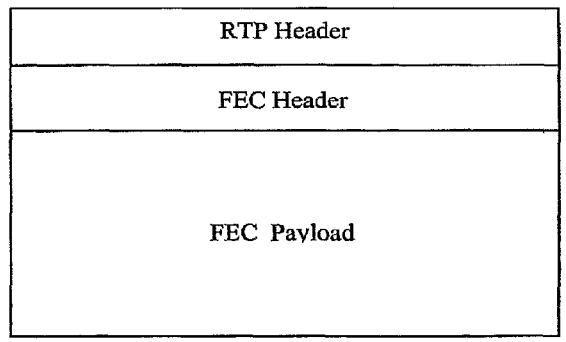
FIG. 4 depicts the FEC packet structure in accordance with the present invention.

The column FEC stream (the first stream) and the row FEC stream (the second stream) may be generated using different FEC codes. The row FEC stream is applied to a row of consecutive packets with the length parameter L. If the columns are aligned this produces a FEC structure as shown in FIG. 3, where the packets labeled RTP are the media packets, the packets labeled FEC are the column FEC stream packets that are generated by FEC (N, K) code (K=D), and the packets labeled FEC' are the row FEC stream packets that are generated by FEC (N', K') code (K'=L).

The receiver/decoder needs to be informed regarding the FEC related control information and the association information between the FEC packet and the media packets protected by the FEC packet so that the receiver/decoder can correctly decode the FEC block and recover any lost media packets. This information is carried in the FEC header of the FEC packet. The basic format for a FEC packet is depicted in FIG.

Figures 5, 6:
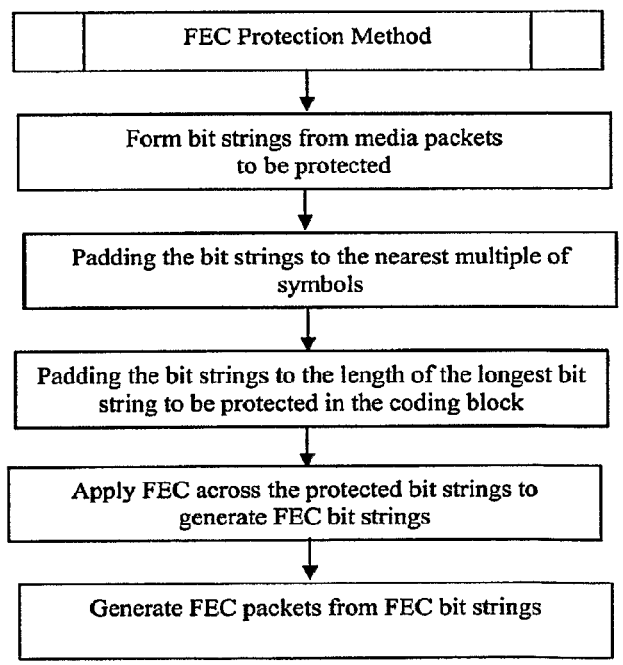
FIG. 5 shows a FEC header in accordance with the present invention.
FIG. 6 is a flowchart of the protection method to support FEC for real-time audio and video over IP networks at the sender/encoder in accordance with the present invention.

4. The FEC data is RTP payload 420. The RTP header 405 is followed by the FEC header 410 and then the FEC payload 415. The FEC header contains, in addition to other information, the FEC type, the total number of packets (media+FEC) resulting from the FEC encoding operation (i.e. the FEC block size), the number of media packets associated with the FEC packet, the minimum sequence number of the media packets associated to the FEC packet, the period used to select the media packets associated with this FEC packet, the FEC packet index, an indication of column FEC stream and row FEC stream. The FEC header also includes the fields of length recovery, payload type recovery and timestamp recovery to recover the RTP header of the media packets. Referring to FIG. 5, an exemplary FEC header is shown with the following definitions of the fields.

SNBase low bits: This is the minimum sequence number of the packets associated with the FEC packet. Where 16 bit sequence numbers are sufficient, this parameter contains the entire sequence number. For transport protocols with longer sequence numbers this field contains the least significant 16 bits of the sequence number.

Length Recovery: This field should be used to recover the length of any lost media packets associated with the FEC packet.

E: This field indicates whether the header is extended. It is set to 1 to indicate that the header is extended.

PT recovery: This field should be used to recover the Payload Type of any lost media packets associated with the FEC packet.

Index ext: This field contains the most significant 5 bits of the FEC parity packet index. For FEC (N, K) code with N−K<8, its value is 0.

Reserved: This field is not used. It is reserved for future extension and is set to zero. The receiver ignores the value of this field.

Total_no: This field indicates the total number of packets (media+FEC) resulting from the FEC encoding operation, i.e. the FEC block size. For a FEC (N, K) (e.g., RS) code, the value of this field is equal to N.

TS Recovery: This field is used to recover the timestamp of any lost media packets associated with the FEC packet.

N: This bit is reserved for future header extensions and is set to zero.

D: This bit is provided as an additional means of determining which FEC packets are associated with which FEC stream. It is set to 0 for FEC packets from the column (first) FEC stream, and set to 1 for FEC packets from the row (second) FEC stream.

Type: This field indicates which error-correcting code is chosen and is set to 2 if 8-bit RS code is used. Receivers ignore packets with an unrecognized type value. The receivers without the capability to decode the specific FEC ignore the FEC packets.

Index: This field contains the least significant 3 bits of the FEC packet index.

Offset: This field is the period used to select the media packets associated with this FEC packet, and for packets computed over columns (the first FEC stream) as shown in FIG. 3, is the number of columns (L parameter) in the matrix. For packets computed over rows (the second FEC stream) this parameter is always one. This field may be changed during a session for each FEC stream for adaptive FEC.

NA: This field indicates the number of media packets associated with the FEC packets encoded with a FEC (N, K) code, and for packets belonging to the first FEC stream as shown in FIG. 3, is the number of rows (D parameter) in the matrix, and corresponds to the number of columns (L parameter) for packets belonging to the second FEC stream. The first FEC stream and the second FEC stream may be generated by FEC codes with different N and/or K parameters. The value of K is equal to D for the first FEC stream and equal to L for the second FEC stream. This field may be changed during a session for each FEC stream for adaptive FEC.

SNBase ext bits: This field is for use with protocols which require extended sequence numbers longer than 16 bits. Where 16 bit sequence numbers are sufficient, this parameter is set to zero. For protocols with longer sequence numbers this field contains the most significant eight bits of the sequence number. That is, the SNBase low bits field contains the low order 16 bits of the sequence number and this filed contains the eight bits higher than the low order 16 bits of the sequence number.

The Index ext field and the Total no field are new fields added by the present invention in order to accommodate support for more powerful FEC codes with the block size N and the number of protected media packets K for real-time audio and video data transmitted over IP networks. The media packets protected by a given FEC packet are defined as those with sequence numbers given by the formula:

$$SNBase + j \times Offset$$

$$0 \leq j < NA$$

As soon as one FEC packet is received by the receiver/decoder, the FEC related control and association information can be obtained from the FEC header.

Both the RTP header and payload of media packets are protected. Referring to FIG. 6, a FEC protection/encoding method is illustrated using a flowchart. The FEC protection method involves generating a bit string for each media packet to be protected by concatenating specific fields from the RTP header of the media packet and the payload at 605, padding the generated bit strings with zeroes to the nearest multiple of symbols at 610, padding the bit strings with zeroes to the length of the longest bit string to be protected in the coding block at 615, applying a FEC code across the media bit strings to generate FEC bit strings at 620 and generating the FEC packets from the FEC bit strings at 625.

The present invention provides a method to form a bit string from a media packet. The following procedures are followed for the protection/encoding operation. For each media packet to be protected, a bit string is generated by concatenating the following fields together in the order specified:

Marker bit (1 bit) (the value of mark bit is 0)
Payload Type (7 bits)
Timestamp (32 bits)
Unsigned network-ordered 16 bit representation of the lengths (in bytes) of the media payload (16 bits)
The payload (variable length)

If the length of a bit string is not equal to a multiple of RS symbols, the bit string is padded to the nearest multiple of symbols. The value for this pad is zero. The pad is added at the end of the bit string. If the lengths of the bit strings are not equal, each bit string that is shorter than the length of the longest bit string, is padded to the length of the longest bit string. The value for this pad is also zero. The pad is added at the end of the bit string. Each resulting bit string is the same length and contains S symbols.

The FEC (N, K) code, e.g. RS code, is then applied across the K media bit strings to generate (N−K) FEC bit strings of size S symbols each. The N−K generated FEC bit strings are used to obtain the N−K FEC packets. For each FEC bit string, the first (most significant) bit in the FEC bit string is written into the marker bit of the RTP header of the FEC packet. The next 7 bits of the FEC bit string are written into the PT recovery field in the FEC packet header. The next 32 bits of the FEC bit string are written into the TS recovery field in the FEC packet header. The next 16 bits are written into the length recovery field in the FEC packet header. The remaining bits are set to be the payload of the FEC packet. The position of FEC packets in a FEC coding block is indexed from 0 to N−K−1. The lower 3 bits of the index of the FEC packet are inserted into the index field of FEC header, the higher 5 bits are inserted into index ext field. The Total no in the FEC header is set to be N.

Figure 7:
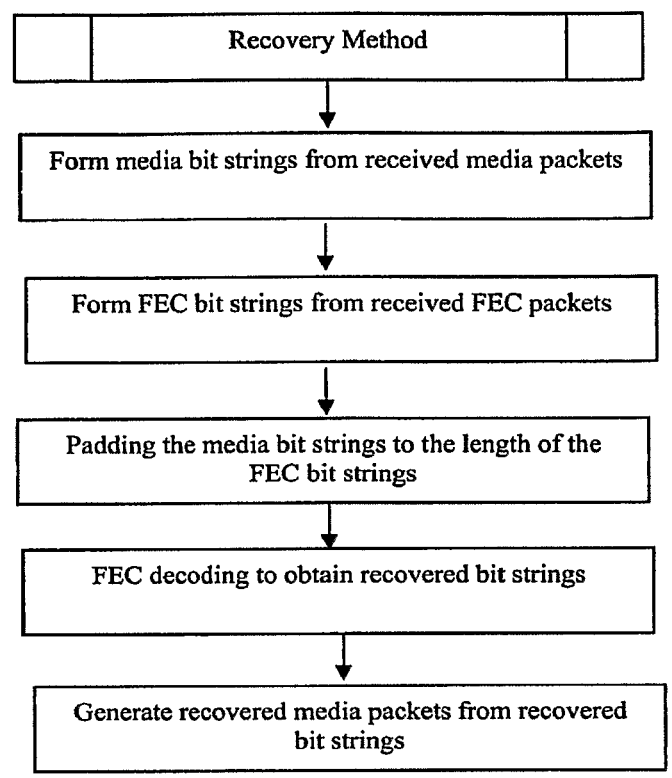
FIG. 7 is a flowchart of the recovery method to support FEC for real-time audio and video over IP networks at the receiver/decoder in accordance with the present invention.

The FEC packets allow receivers/decoders to recover from the loss of media packets. The present invention provides a method for recovery from packet loss at the receiver. Each individual FEC packet header indicates the FEC block size, the base sequence number (SNbase), the offset, and the number of protected media packets (NA), as well as the FEC packet index. A receiver retrieves these transmitted values in each FEC packet to correctly associate the FEC packet with the original media packets and place the packet in the correct position for recovery. The packets (media and FEC) are arranged correctly. The RS FEC decoding is performed on the bit strings obtained from received media and FEC packets to recover the lost packets. Referring to FIG. 7, the present invention provides a method for the recovery from packet loss as follows.

Form media bit strings from received media packets by reversing the process outlined above at 705.

For the FEC packet, a bit string is generated by concatenating the following fields together in the order specified at 710:

Markerbit (1 bit)
PT recovery (7 bits)
TS recovery (32 bits)
Length recovery (16 bits)
FEC payload (variable length)

If any of the bit strings generated from the media packets are shorter than the bit string generated from the FEC packet, pad them to be the same length as the bit string generated from the FEC packet at 715. The padding is added at the end of the bit string and the value of the padding is 0.

Perform RS decoding across the bit strings, resulting in recovered bit strings at 720.

Obtain each recovered packet from each recovered bit string at 725.

Create a recovered packet with the standard 12 byte RTP header and no payload.
Set the version of the new packet to 2.
Set the values of P, X, CC and M fields
Discard the first bit in the recovery bit string.
Set the payload type in the recovered packet to the next 7 bits in the recovery bit string.
Set the SN field in the recovered packet according to the SNBase, Offset, and position of the recovered bit string in the encoded block. If the recovered packet is the jth media packet in the encoded block, its SN is equal to SNBase+(j−1)×Offset, (1≤j≤NA).
Set the TS field in the recovered packet to the next 32 bits in the recovered bit string.
The next 16 bits of the recovered bit string (assuming network-order and in unsigned integer) represents the length of the payload. Take the number of bytes represented by these 16 bits of the recovered bit string from the following recovered bit string and append them to the recovered packet. This represents the payload.
Set the SSRC of the recovered packet to the SSRC of the media stream it's protecting.

This method completely recovers both the header and payload of an RTP packet.

Any interleaving scheme and packet transmission scheduling algorithm can be used to ensure that FEC packets are interleaved with data packets in a way that avoids large changes in sending rate over time. For example, the FEC process module at the sender can pass through the media packets immediately upon receiving them and keep a local copy. When enough media packets for a coding block are received or a timer expires, it then generates FEC packets and sends them out. It should be noted that in every case, each individual FEC packet indicates the FEC block size, the base sequence number (SNbase), the offset and the number of data packets (NA), as well as the FEC packet index. Receivers retrieve these transmitted values in each FEC packet to correctly associate the FEC packet with the original data-stream packets and; place the packet in the correct position for recovery.

Figure 8:
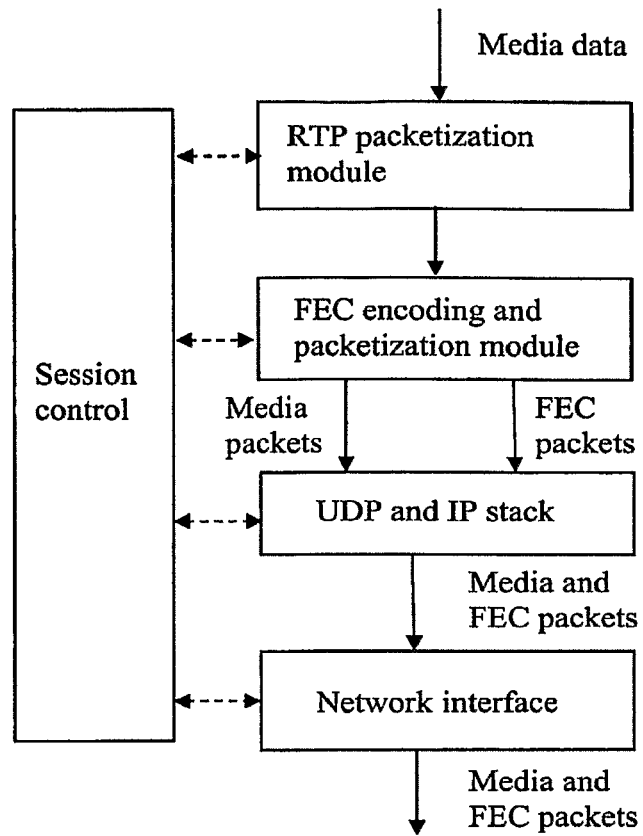
FIG. 8 is a schematic diagram of the encoding/protection process to support FEC for real-time audio and video over IP networks at the sender/encoder in accordance with the present invention.

FIG. 8 is a schematic diagram of the encoding/protection process to support FEC for real-time audio and video over IP networks at the sender/encoder in accordance with the present invention. The FEC protection/encoding process involves generating a bit string for each media packet to be protected by concatenating specific fields from the RTP header of the media packet and the payload, padding the generated bit strings with zeroes to the nearest multiple of symbols and padding the bit strings with zeroes to the length of the longest bit string to be protected in the coding block by RTP packetization module 805. Next a FEC code is applied across the media bit strings to generate FEC bit strings and generate the FEC packets from the FEC bit strings by FEC encoding and packetization module 810. The media packets and the FEC packets are then communicated through the UDP/IP protocol stack 815 and over the network interface 820. RTP packetization module 815, FEC encoding and packetization module 810, UDP/IP protocol stack 815 and network interface 820 are all in communication with and controlled by session control module 825.

Figure 9:
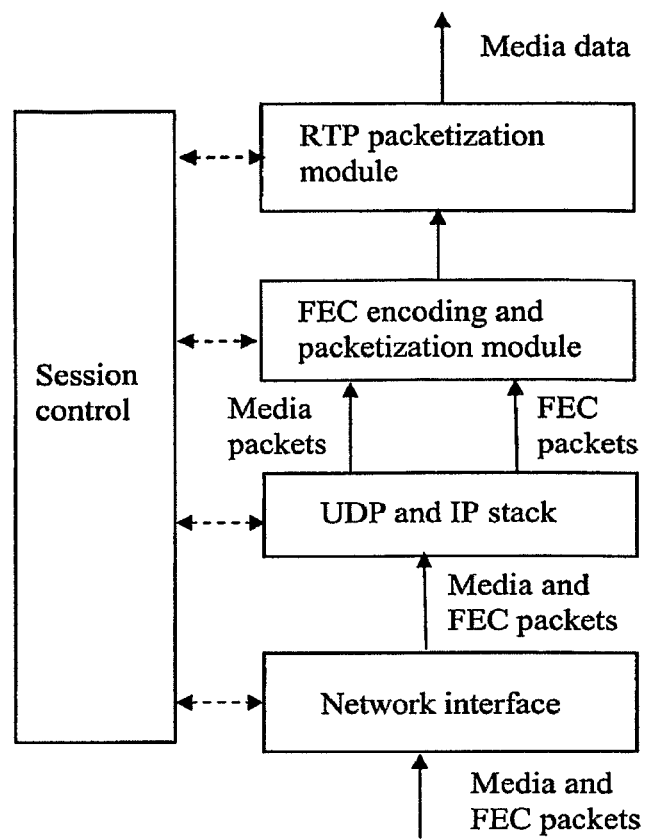
FIG. 9 is a schematic diagram of the recovery process to support FEC for real-time audio and video over IP networks at the receiver/decoder in accordance with the present invention.

FIG. 9 is a schematic diagram of the recovery process to support FEC for real-time audio and video over IP networks at the receiver/decoder in accordance with the present invention. Media and FEC packets are received by network interface 905. Network interface forwards the received media packets and FEC packets to the UDP/IP protocol stack 910. The UDP/IP protocol stack 910 forwards the media packets and the FEC packets to the FEC decoding and de-packetization module 915. The FEC decoding and de-packetization module 915 separates and interprets the fields of the FEC packet header and placed the received media packets and FEC packets in correct order in a FEC coding block, and forms media bit strings from formed media packets and FEC bit strings from received FEC packets. Then RS decoding is performed across the bit strings resulting in recovered bit strings. The recovered packets are thus obtained from the recovered bit strings. The FEC decoding and de-packetization module forwards the data to the RTP de-packetization module 920, which obtains the RTP header information and RTP payload data from the RTP packet. The network interface 905, the UDP/IP protocol stack 910, the FEC decoding and de-packetization module 915 and the RTP de-packetization module 920 are all in communication with and controlled by session control module 925.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for protecting real time media, said method comprising:
  receiving media packets;
  re-ordering said media packets to form a two dimensional matrix of a number of columns and a number of rows;
  generating media bit strings from said media packets;
  padding each of said generated media bit strings to a nearest multiple of symbols at a trailing end of each of said generated media bit strings;
  further padding at a trailing end of said previously padded bit strings such that each padded bit string has a length of the longest bit string;
  applying a forward error correcting code across said generated media bit strings to generate a plurality of forward error correcting bit strings;
  generating forward error correcting packets from said forward error correcting bit strings; and
  transmitting said generated forward error correcting packets, said forward error correcting packets separated by a dimension of said two dimensional matrix of said media packets which served as a basis for generation of said forward error correcting packets, wherein said forward error correcting packets are generated without changing a format of said media packets and are transmitted separately from said media packets using different port than a port used to transmit said media packets enabling non-forward error correcting systems to receive and recover said media packets.

2. The method according to claim 1, wherein each of said media bit strings is generated by concatenating a set of fields from a real time transport protocol header, a payload length and a payload of each of said media packets in an order.

3. The method according to claim 2, further wherein said set of fields and said order comprises a marker bit, a payload type, a timestamp, a representation of a length of a media payload and said media payload.

4. The method according to claim 1, wherein each of said generated forward error correcting bit strings is used to fill in a forward error correction packet header.

5. The method according to claim 4, further comprising:
  inserting a predetermined number of low order bits of an index of said forward error correcting packet into a first index field of said forward error correction packet header;
  inserting a predetermined number of higher order bits of said index of said forward error correcting packet into a second index field of said forward error correction packet header; and
  setting a total number field of said forward error correction packet header to a predetermined number indicating a total number of forward error correcting packets and media packets in a forward error correcting block.

6. An apparatus for protecting real time media, comprising:
  means for receiving media packets;
  means for re-ordering said media packets to form a two dimensional matrix of a number of columns and a number of rows;
  means for generating media bit strings from said media packets;
  means for padding each of said generated media bit strings to a nearest multiple of symbols at a trailing end of each of said generated media bit strings;
  means for further padding at a trailing end of said previously padded bit strings such that each padded bit string has a length of the longest bit string;
  means for applying a forward error correcting code across said generated media bit strings to generate a plurality of forward error correcting bit string;
  means for generating forward error correcting packets from said forward error correcting bit strings; and
  means for transmitting said generated forward error correcting packets, said forward error correcting packets separated by a dimension of said two dimensional matrix of said media packets which served as a basis for generation of said forward error correcting packets, wherein said forward error correcting packets are generated without changing a format of said media packets and are transmitted separately from said media packets using a different port than a port used to transmit said media packets enabling non-forward error correcting systems to receive and recover said media packets.

7. The apparatus according to claim 6, wherein each of said media bit strings is generated by concatenating a set of fields from a real time transport protocol header, a payload length and a payload of each of said media packets in an order.

8. The apparatus according to claim 7, further wherein said set of fields and said order comprises a marker bit, a payload type, a timestamp, a representation of a length of a media payload and said media payload.

9. The apparatus according to claim 6, wherein each of said generated forward error correcting bit strings is used to fill in a forward error correction packet header.

10. The apparatus according to claim 9, further comprising:
  means for inserting a predetermined number of low order bits of an index of said forward error correcting packet into a first index field of said forward error correction packet header;
  means for inserting a predetermined number of higher order bits of said index of said forward error correcting packet into a second index field of said forward error correction packet header; and means for setting a total number field of said forward error correction packet header to a predetermined number indicating a total number of forward error correcting packets and media packets in a forward error correcting block.

11. A method for recovering from losses of real time media packets, said method comprising:
re-ordering received media packets to form a two-dimensional matrix of a number of columns and a number of rows of received media packets;
forming media bit strings from received and re-ordered media packets;
forming forward error correcting bit strings from received forward error correcting packets, wherein said forward error correcting packets are generated without changing a format of said media packets and are transmitted separately from said media packets using a different port than a port used to transmit said media packets enabling non-forward error correcting systems to receive and recover said media packets;
padding said media bit strings to the length of the forward error correcting bit strings;
decoding said media bit strings and said forward error correcting bit strings to obtain recovered media bit strings; and
generating recovered media packets from said recovered media bit strings.

12. The method according to claim 11, further comprising removing padding said media bit strings at a trailing end of said media bit strings to a length of said forward error correcting bit strings.

13. An apparatus for recovering from losses of real time media packets, comprising:
means for re-ordering received media packets to form a two-dimensional matrix of a number of columns and a number of rows of received media packets;
means for forming media bit strings from received media packets;
means for forming forward error correcting bit strings from received forward error correcting packets, wherein said forward error correcting packets are generated without changing a format of said media packets and are transmitted separately from said media packets using a different port than a port used to transmit said media packets enabling non-forward error correcting systems to receive and recover said media packets;
means for removing padding said media bit strings to the length of the forward error correcting bit strings;
means for decoding said media bit strings and said forward error correcting bit strings to obtain recovered media bit strings;
means for generating recovered media packets from said recovered media bit strings; and
means for re-ordering said recovered media packets to form a two dimensional matrix of a number of columns and a number of rows of recovered media packets.

14. The apparatus according to claim 13, further comprising means for removing padding said media bit strings at a trailing end of said media bit strings to a length of said forward error correcting bit strings.

15. An apparatus for protecting real time media, comprising:
a real time transport protocol packetization module, said real time transport protocol packetization module receiving media packets;
said real time transport protocol packetization module re-ordering said media packets to form a two dimensional matrix of a number of columns and a number of rows;
said real time transport protocol packetization module generating media bit strings from said media packets;
said real time transport protocol packetization module padding each of said generated media bit strings to a nearest multiple of symbols at a trailing end of each of said generated media bit strings;
said real time transport protocol packetization module further padding at a trailing end of said previously padded bit strings such that each padded bit string has a length of the longest bit string;
a forward error correction encoding and packetization module, said forward error correction encoding and packetization module applying a forward error correcting code across said generated media bit strings to generate a plurality of forward error correcting bit string, said forward error correction encoding and packetization module in communication with said real time transport protocol packetization module;
said forward error correction encoding and packetization module generating forward error correcting packets from said forward error correcting bit strings; and
a user datagram protocol and internet packet stack and network interface module, said a user datagram protocol and internet packet stack and said network interface module transmitting said generated forward error correcting packets, said forward error correcting packets separated by a dimension of said two dimensional matrix of said media packets which served as a basis for generation of said forward error correcting packets, wherein said forward error correcting packets are generated without changing a format of said media packets and are transmitted separately from said media packets using a different port than a port used to transmit said media packets enabling non-forward error correcting systems to receive and recover said media packets, said a user datagram protocol and internet packet stack in communication with said network interface module, said a user datagram protocol and internet packet stack also in communication with said forward error correction encoding and packetization module.

16. The apparatus according to claim 15, wherein each of said media bit strings is generated by concatenating a set of fields from a real time transport protocol header, a payload length and a payload of each of said media packets in an order.

17. The apparatus according to claim 16, further wherein said set of fields and said order comprises a marker bit, a payload type, a timestamp, a representation of a length of a media payload and said media payload.

18. The apparatus according to claim 15, wherein each of said generated forward error correcting bit strings is used to fill in a forward error correction packet header.

19. The apparatus according to claim 18, further comprising:
said forward error correction encoding and packetization module inserting a predetermined number of low order bits of an index of said forward error correcting packet into a first index field of said forward error correction packet header;
said forward error correction encoding and packetization module inserting a predetermined number of higher order bits of said index of said forward error correcting packet into a second index field of said forward error correction packet header; and said forward error correction encoding and packetization module setting a total number field of said forward error correction packet header to a predetermined number indicating a total number of forward error correcting packets and media packets in a forward error correcting block.

20. The apparatus according to claim 15, further comprising a storage medium having stored thereon a data structure for a forward error correcting header, said data structure comprising a field for indicating a total number of forward error correcting packets and media packets, wherein said forward error correcting packets are generated without changing a format of said media packets and are transmitted and received separately from said media packets using a different port than a port used to transmit said media packets enabling non-forward error correcting systems to receive and recover said media packets.

21. An apparatus for recovering from losses of real time media packets, comprising:
    a forward error correction encoding and packetization module, said forward error correction encoding and packetization module re-ordering received media packets to form a two-dimensional matrix of a number of columns and a number of rows of received media packets;
    said forward error correction encoding and packetization module forming media bit strings from received media packets;
    said forward error correction encoding and packetization module forming forward error correcting bit strings from received forward error correcting packets, wherein said forward error correcting packets are generated without changing a format of said media packets and are transmitted separately from said media packets using a different port than a port used to transmit said media packets enabling non-forward error correcting systems to receive and recover said media packets;
    a real time transport protocol packetization module, said real time transport protocol packetization module removing padding said media bit strings to the length of the forward error correcting bit strings, said real time transport protocol packetization module in communication with said forward error correction encoding and packetization module;
    said real time transport protocol packetization module decoding said media bit strings and said forward error correcting bit strings to obtain recovered media bit strings;
    said real time transport protocol packetization module generating recovered media packets from said recovered media bit strings; and
    said real time transport protocol packetization module re-ordering said recovered media packets to form a two dimensional matrix of a number of columns and a number of rows of recovered media packets.

22. The apparatus according to claim 21, further comprising said real time transport protocol packetization module removing padding said media bit strings at a trailing end of said media bit strings to a length of said forward error correcting bit strings.

23. The apparatus according to claim 21, further comprising a storage medium having stored thereon a data structure for a forward error correcting header, said data structure comprising a field for storing a predetermined number of a forward error correcting packet index, wherein said forward error correcting packets generated without changing a format of said media packets and are transmitted and received separately from said media packets using a different port than a port used to transmit said media packets enabling non-forward error correcting systems to receive and recover said media packets.

* * * * *